Dec. 26, 1939.  L. W. MELCHER  2,185,033
REFRIGERATING APPARATUS
Filed June 2, 1938   3 Sheets-Sheet 1
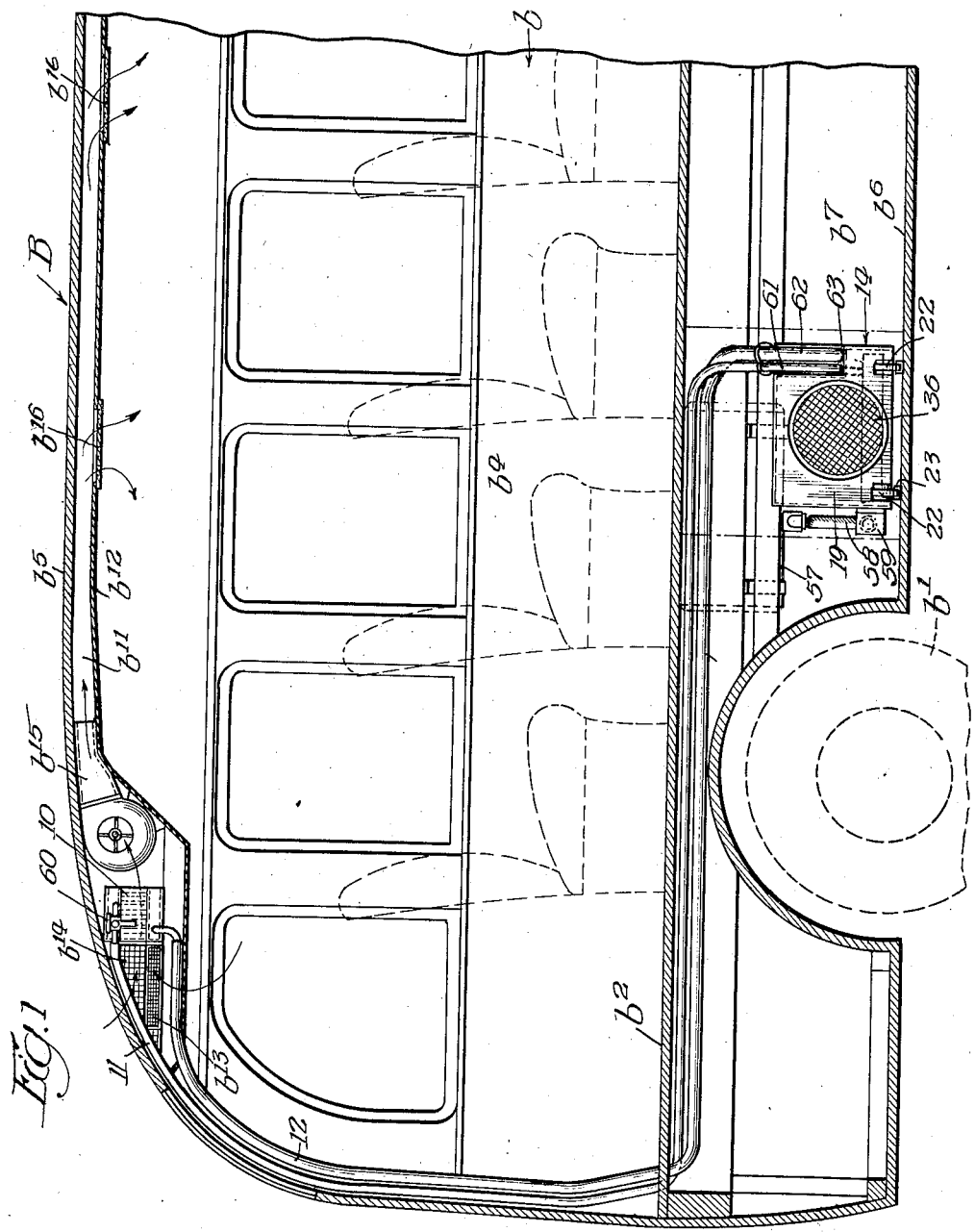
Inventor:-
Lee W. Melcher
By Thos Gerlach
his Atty.

Dec. 26, 1939.  L. W. MELCHER  2,185,033
REFRIGERATING APPARATUS
Filed June 2, 1938   3 Sheets-Sheet 2
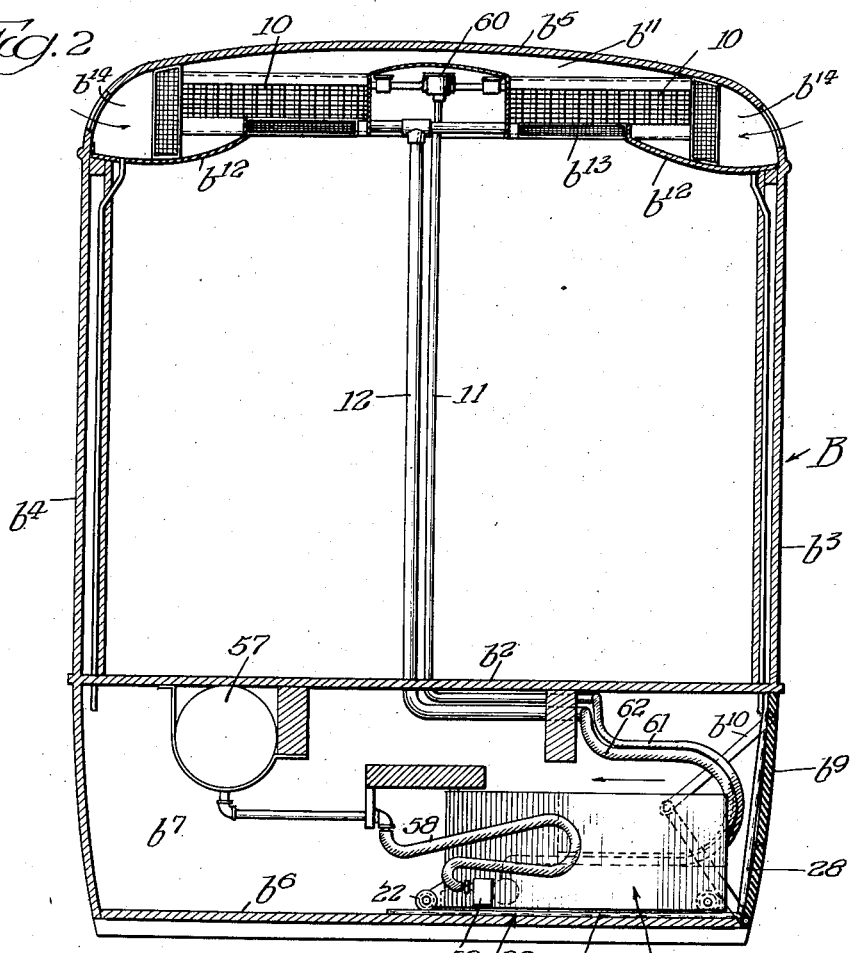
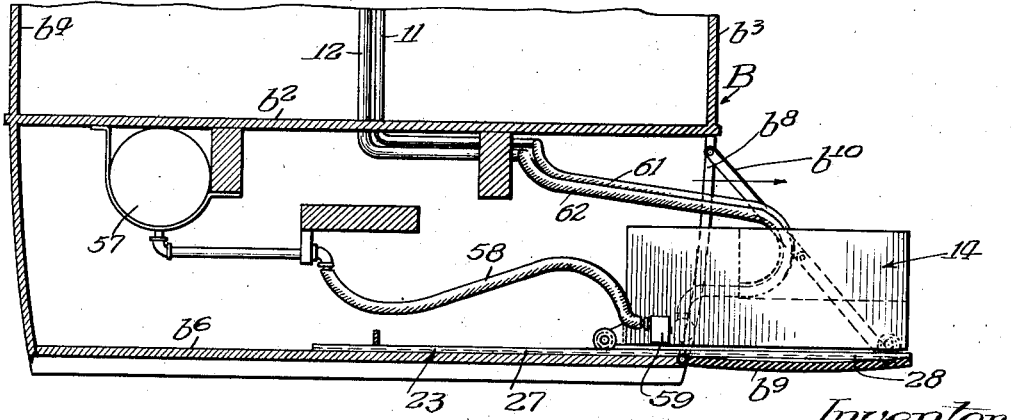
Inventor
Lee W. Melcher
By Thed Gerlach
his Atty.

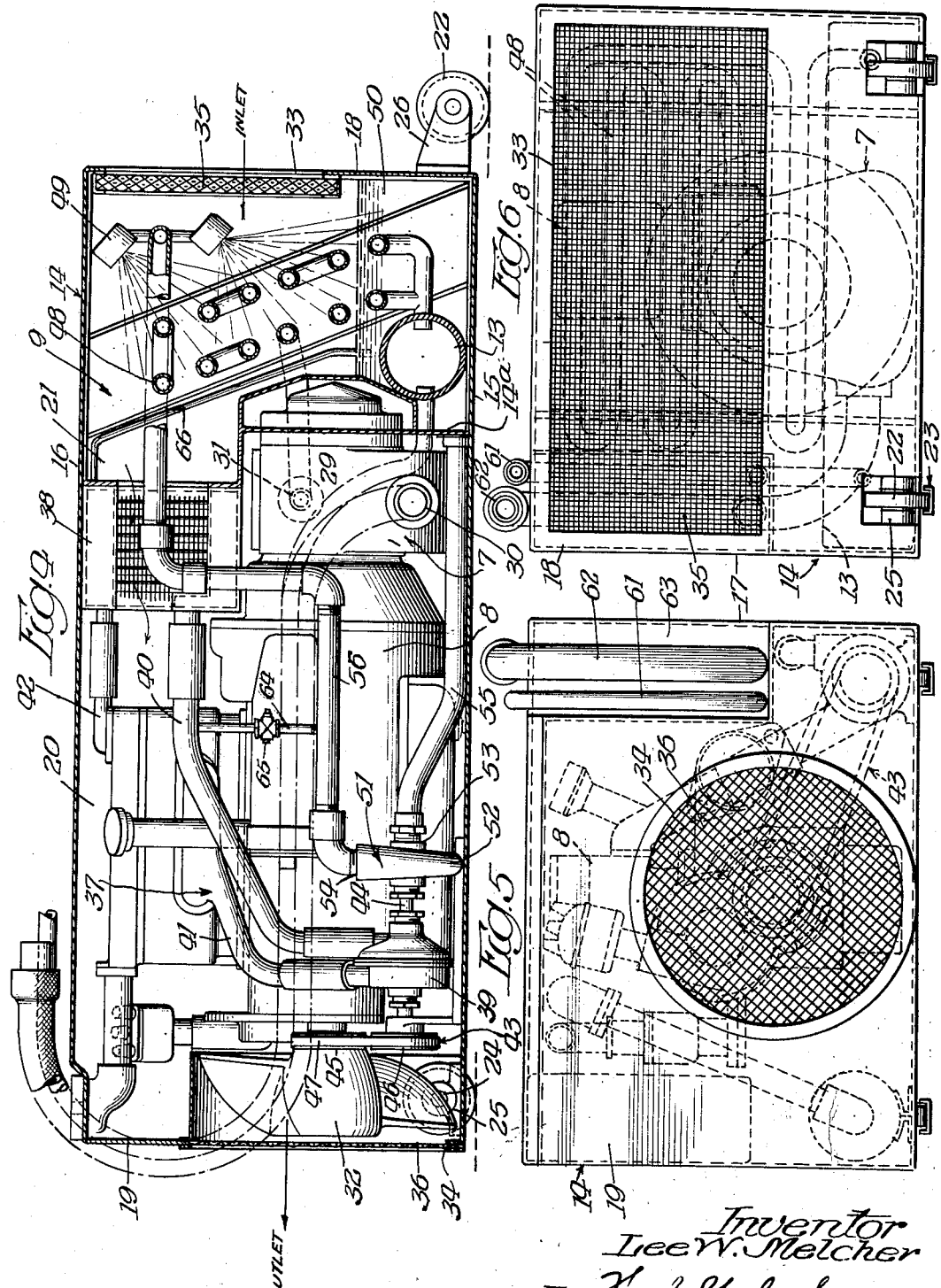

Patented Dec. 26, 1939

2,185,033

UNITED STATES PATENT OFFICE 2,185,033

REFRIGERATING APPARATUS

Lee W. Melcher, Oconomowoc, Wis., assignor to Waukesha Motor Company, Waukesha, Wis., a corporation of Wisconsin Application June 2, 1938, Serial No. 211,309

20 Claims. (Cl. 62—117)

The present invention relates generally to refrigerating apparatus. More particularly the invention relates to that type of refrigerating apparatus which is adapted for use in conditioning or cooling the air within the body of a wheeled vehicle such as a bus and comprises a compressor and a compressor driving engine under the vehicle body, an expansion valve equipped evaporator in the body of the vehicle, a high pressure refrigerant line leading from the compressor to the expansion valve and including a condenser for the refrigerant and a receiver between the condenser and the expansion valve, and a low pressure refrigerant line leading from the outlet side of the evaporator back to the compressor.

One object of the invention is to provide a refrigerating apparatus of this type which because of the specific design and arrangement of the component parts thereof is efficient in operation and well suited or adapted for its intended purpose and at the same time occupies but a comparatively small space and is so light in weight that it imposes but a comparatively small burden or load on the vehicle propelling means.

Another object of the invention is to provide a refrigerating apparatus of the type and character under consideration in which the compressor driving engine is of the internal combustion liquid cooled type and the condenser is of the evaporative type and the engine and condenser as well as the compressor are mounted in a box-like housing which is movably supported in such manner that the operating parts therein are shiftable back and forth between a normal operating position under the vehicle body and an inspection or repair position at one side of the body of the vehicle.

Another object of the invention is to provide a refrigerating apparatus of the last mentioned character in which the internal combustion engine for driving the refrigerant compressor is connected to drive a cooling fan and also the pump of the evaporative condenser and the radiator of the cooling system of the engine and the coil of the evaporative condenser are so arranged within the box-like housing that during operation of the apparatus the air which is displaced by the cooling fan travels first through the evaporative condenser and then through the radiator of the cooling system with the result that the latter in addition to being exceptionally efficient because of the benefit resulting from the evaporative effect of the moisture laden air passing therethrough serves as an arrester whereby the majority of the moisture in the air stream is arrested and diverted back into the sump part of the evaporative condenser.

A further object of the invention is to provide a refrigerating apparatus of the type under consideration which includes a vehicle body supported water supply tank for the evaporative condenser and a flexible connection between the tank and the sump part of the condenser whereby the condenser is permitted to move with the engine and compressor without disconnecting any pipe connection or like connecting medium.

A still further object of the invention is to provide a refrigerating apparatus of the type under consideration which includes novel means for supplying water from the evaporative condenser to the cooling system for the internal combustion engine in order automatically to maintain the system with a full water supply at all times.

In addition the invention contemplates as one of its objects the provision of a refrigerating apparatus which is generally an improvement upon, and has certain capabilities of use and advantage over, previously designed refrigerating apparatus of the same general character or type and for the same purpose.

Other objects of the invention and the various advantages and characteristics of the present refrigerating apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a fragmentary vertical longitudinal section of an automobile type bus having applied thereto a refrigerating apparatus embodying the invention;

Figure 2 is a vertical transverse section of the bus, showing the engine-compressor-condenser unit in its normal operating position under the bottom of the bus body;

Figure 3 is a fragmentary vertical transverse section showing the box-like housing slid outwardly in order to bring the engine-compressor-condenser unit into its inspection or repair position at one side of the bus body;

Figure 4 is a vertical longitudinal section of the engine-compressor-condenser unit of the apparatus illustrating in detail the arrangement of the parts thereof and showing the manner in which the internal combustion engine for driving the refrigerant compressor is connected to drive the pump of the evaporative condenser and also the manner in which the cooling fan for the engine serves during operation of the refrigerating apparatus to draw air successively through the evaporative condenser and the radiator of the cooling system of the engine;

Figure 5 is a front view of the box-like housing for the engine-compressor-condenser unit, showing in detail the position and arrangement of the screened outlet opening in front of the cooling fan for the engine; and Figure 6 is a rear view of the housing for the unit.

The refrigerating apparatus which is shown in the drawings constitutes the preferred embodiment of the invention. It is designed and primarily adapted for conditioning or cooling air and is illustrated in connection with an automobile type bus B comprising an elongated body $b$ and supporting wheels $b^1$. Certain of the wheels are adapted to be driven by an internal combustion engine (not shown) in connection with propulsion of the bus from place to place. The body $b$ defines a compartment for passengers and comprises a bottom $b^2$, a pair of sides $b^3$ and $b^4$, and a top $b^5$. The sides $b^3$ and $b^4$ are spaced laterally apart by the bottom and top of the body and embody bottom extensions which project beneath the body bottom $b^2$ and together with said bottom and a sub-bottom $b^6$ define a space $b^7$ under the bus body. As hereinafter described the main operating parts of the refrigerating apparatus are normally located or disposed in this space. Access to the space $b^7$ is provided by way of a doorway $b^8$ in the bottom extension of the body side $b^3$. This doorway is adapted to be closed by means of a door $b^9$ which is hinged at the lower portion thereof to the adjacent portion of the sub-bottom $b^6$ so that it may be swung outwardly from a closed position into an open position, as shown in Figure 3 of the drawings. Pairs of pivoted links $b^{10}$ extend between the upper or distal portion of the door and the upper portion of the doorway and serve to support the door in a substantially horizontal position when it is swung outwardly in order to provide access to the space $b^7$ via the doorway $b^8$. An elongated longitudinally extending duct $b^{11}$ is formed beneath the top $b^5$ of the bus body by way of a sub-top $b^{12}$. The rear portion of the sub-top $b^{12}$ is provided with a pair of screen equipped inlets $b^{13}$ for introducing air into the duct $b^{11}$ from the passenger compartment, that is, the interior of the bus body and the rear side portions of the main top $b^5$ are provided with a pair of screen equipped inlet openings $b^{14}$ for introducing outside air into the duct $b^{11}$. A motor driven blower $b^{15}$ is disposed in front of the inlet openings $b^{13}$ and $b^{14}$ and operates during drive thereof to draw air into the duct via said inlets and to force it under pressure into the passenger compartment within the body by way of grill equipped discharge openings $b^{16}$ in the front portion of the sub-top $b^{12}$. The improved refrigerating apparatus when in operation, as hereinafter described, operates to cool or refrigerate the air that passes or travels through the duct $b^{11}$ and thence into the passenger compartment in the bus body $b$. Said apparatus is independent of the propelling means of the bus and comprises as the main operating parts thereof a compressor 7, a compressor driving engine 8, an evaporative condenser 9, an evaporator 10, a high pressure refrigerant line 11, and a low pressure refrigerant line 12. The high pressure line leads from the compressor to the evaporator and includes the evaporative condenser 9 and a receiver 13. The low pressure refrigerant line constitutes the refrigerant return and leads from the evaporator back to the compressor.

The compressor 7, the engine 8, and the evaporative condenser 9 are in the form of a unit and are disposed or mounted in an elongated box-like housing 14. The latter is normally disposed in and extends transversely of the space $b^7$ between the bottom $b^2$ and the sub-bottom $b^6$. It is formed of sheet or plate metal and consists of a bottom 15, a top 16, a pair of side walls 17, an inner end wall 18, and an outer end wall 19. The latter are rigidly or fixedly secured together in any suitable manner and together with a substantially vertical partition 14$^a$ form a compressor-engine chamber 20 in the outer portion of the housing and a condenser chamber 21 in the inner portion of the housing. The housing 14 is aligned with the doorway $b^8$ in the bottom extension of the sides $b^3$ of the bus body and is provided at the lower corners thereof with wheels 22. These wheels are provided with tires of any suitable material for cushioning and shock absorbing purposes and travel on a pair of laterally spaced tracks 23. The wheels at the outer lower corners of the housing are mounted on a pair of stub axles 24 which are mounted in pairs of bearing brackets 25 on the housing bottom 15. The other two wheels, that is, the wheels at the inner lower corners of the housing are carried by a pair of brackets 26 which are fixedly secured to and project inwardly from the inner end wall 18 of the housing. The tracks 23 are formed of channel bars, as shown in Figures 5 and 6, and extend transversely of the body $b$ of the bus. They underlie the bus bottom $b^2$ and consist of inner sections 27 and outer sections 28. The inner sections are suitably secured to the top face of the sub-bottom $b^6$ and extend inwardly from the bottom portion of the doorway $b^8$. The outer sections 28 are secured to the inner face of the door $b^9$ and are pivotally connected to the inner sections 27 so that they are free to swing with the door. Normally the housing 14 for the compressor-engine-condenser unit is disposed in the space $b^7$ and is carried by the inner track sections 27. When it is desired to inspect or repair any parts of the unit the door $b^9$ is swung outwardly and downwardly into its open position wherein it is supported by the pairs of pivoted links $b^{10}$. When the door is in its open position the outer track sections 28 are longitudinally aligned with the inner sections 27 and permit the housing together with the unit to be rolled outwardly, as shown in Figure 3, into what may be termed an inspection or repair position outwardly of the side $b^3$ of the bus body $b$. Suitable stops (not shown) are connected to the outer ends of the outer track sections and the inner ends of the inner track sections and serve to limit sliding or rolling of the housing. When the housing is in its inspection or repair position the two wheels at the outer lower corners of the housing rest on the outer or distal ends of the outer track sections 28. The top 16 and side wall 17 of the housing are provided with removable panels (not shown) so that access may be had to the operating parts in the housing when the housing is in its inspection position at one side of the bus body. After inspection or repair of the operating parts of the refrigerating apparatus within the housing the housing is adapted to be rolled or bodily shifted into its operative or normal position within the space $b^7$. After such shift the housing is locked against longitudinal sliding or rolling movement in any suitable manner and the door $b^9$ is swung upwardly and inwardly into its closed position. The wheels 22 and the tracks 27 with the outer door mounted sections 28 constitute simple means for supporting the housing so that it, together with the operating parts therein, may be shifted back and forth between a normal operating position under the bottom of the bus body and an inspection or repair position outwardly of the side wall $b^3$ of the body $b$.

The compressor 7 is of the rotary vane pump type and is positioned in the central portion of the housing 14. It is disposed adjacent to the partition 14ª and is separated by the latter from the evaporative condenser. The partition, as shown in Figure 4, extends transversely across the rear portion of the housing and is suitably connected at the side margins thereof to the side walls 17 of the housing. The compressor comprises a casing 29 and a vane-equipped rotor (not shown). The casing rests on and is suitably secured to the bottom 15 of the housing and is provided with a refrigerant inlet 30 and a refrigerant outlet 31. The inlet is connected to the discharge end of the low pressure refrigerant line 12 and the outlet is connected to the inlet end of the high pressure refrigerant line 11. When the rotor of the compressor is driven the vane of the compressor operates to draw the refrigerant from the low pressure refrigerant line and to supply it in highly compressed gaseous form to the inlet end of the high pressure refrigerant line 11.

The engine 8 is of the internal combustion type and is disposed in the outer portion of the housing 14. It extends longitudinally of the housing and has the inner or rear end of the crank shaft thereof connected to the van equipped rotor of the compressor so that it operates to drive the compressor when placed in operation. The outer or front end of the crank shaft terminates inwardly of the outer end wall 19 of the housing 14 and carries a cooling fan 32. This fan when the engine is in operation operates to draw air through an opening 33 in the inner end wall 18 of the housing and to expel it through an opening 34 in the outer end wall 19. A dust filter 35 extends across the opening 33 and is suitably mounted on the inner end wall 18 of the housing. A screen 36 extends across the opening 34 and serves as a guard for the fan 32. The engine 8 embodies a cooling system 37 for preventing overheating. This system consists of a radiator 38 and a pump 39. The radiator is of the fin-equipped tube type and is disposed in the central portion of the housing 14 over the pump type compressor 7. The lower portion of the radiator is connected by a pipe 40 to the inlet side of the pump and the outlet side of the pump is connected by a pipe 41 to the usual jacket around the cylinders of the engine. A pipe 42 extends between and serves to connect the jacket of the cylinder head of the engine and the upper end of the radiator 28. The pump 39 is adapted to be driven by a belt and pulley connection 43 and serves when in operation to circulate a cooling liquid such as water through the jacket around the engine cylinders and thence through the jacket in the cylinder head of the engine and via the pipe 42 to the radiator and then through the radiator and back to the pump via the pipe 42. When the motor is in operation the air which is displaced by the fan 32 flows through the radiator 38 and serves to cool the water that is circulated therethrough. The pump 39 is located at one side of the engine and has a horizontally extending rotor shaft 44 which extends longitudinally of the housing 14 and is of such length that the ends thereof project beyond the ends of the pump casing. The belt and pulley connection 43 comprises a pulley 45 on the hub part of the fan 32, a pulley 46 on the front end of the shaft 44 of the pump 39, and an endless belt 47 around the two pulleys. When the fan is driven by the engine the pulley 45 on the hub thereof operates through the medium of the belt 47 and the pulley 46 to drive the pump 39 of the cooling system 37. Fuel is supplied to the engine by way of a flexible pipe (not shown) which permits the engine to be shifted with the housing into and out of its normal operating position without disconnection of such pipe. The engine is controlled by way of other connections (not shown) which are also flexible like the fuel supply pipe.

The evaporative condenser 9 is located in the chamber 21 between the inner end wall 18 of the housing 14 and the partition 14ª and comprises a condenser coil 48 and a plurality of spray pipes 49. The coil 48 is included in and forms a part of the high pressure refrigerant line 11 and is adapted to have water sprayed thereover by the pipes 49 so that the evaporative effect of the water serves to condense the refrigerant, as well understood in the art. The partition 14ª and the lower portion of the inner end wall 18 of the housing together with the intermediate portions of the side walls and bottom of the housing define a sump 50 for a column of water. The condenser coil 48 extends upwardly and forwardly across the space 21, as shown in Figure 4, and overlies the sump 50. The spray pipes 49 are suitably mounted adjacent to the upper end of the condenser coil and are supplied with water under pressure from the sump by way of a pump 51. This pump embodies a casing 52 and a rotor (not shown). The casing embodies a water inlet 53 and an outlet 54 and is located adjacent to the casing of the pump 39 of the cooling system 37. The rotor of the pump is connected to the rear end of the rotor shaft 44 of the pump 39 so that it is driven conjointly therewith. The inlet 53 of the casing 52 of the condenser pump is connected by a pipe 55 to receive water from the lower portion of the sump 50 and the outlet 54 of the pump casing 52 is connected by a pipe 56 to the spray pipes 49. When the internal combustion engine 8 is in operation the pump 51 operates to draw water from the sump 50 through the pipe 55 and then, to deliver such water under pressure through the pipe 56 to the spray pipes 49. The latter serve to jet or spray the water on the coil 48 of the condenser. As a result of the cooling effect of the water on the coil the refrigerant flowing through the coil is condensed or liquefied. By having the pump 51 of the evaporative condenser connected for drive by the engine the evaporative condenser is automatically set into operation when the engine is started in connection with operation of the refrigerating apparatus. The air which is displaced by the fan 52 during operation of the engine flows successively through the condenser chamber 21, the radiator 38 and the compressor-engine chamber 20. As the air passes through the chamber 21 it assists in the evaporation of the water sprayed against the condenser coil 48. The radiator 38 by reason of its location and the fact that the air in transit to the fan 32 travels therethrough after leaving the condenser chamber 21 serves to arrest any moisture in the air stream and causes such moisture to return to the sump 50. By reason of the fact that the air which passes through the radiator 38 is moisture laden the radiator has an exceptionally large cooling capacity as the result of the avaporative effect of the moisture in the air. The sump 50 is supplied with water from a supply tank 57. This tank is mounted under the bottom $b^2$ of the bus body $b$ and is connected to the sump 50 by way of a connection which includes a flexible hose 58. The discharge end of the hose is connected to a valve box 59 at one side of the box-like housing 14 and communicates with the sump 50 via the valve box. The latter includes a float controlled valve (not shown) whereby the flow of water into the sump from the water tank 57 is so controlled that the water in the sump is maintained at a uniform or constant level. The hose 58 is of sufficient length to permit the housing 14 with the various operating parts of the refrigerating apparatus therein, to be shifted into its inspection position at one side of the body of the bus, as shown in Figure 3, without necessitating detachment or disconnection of the hose. The receiver 13 serves as a storage receptacle for the liquefied refrigerant and is disposed in the water sump 50 of the evaporative condenser. It is connected to the discharge end of the condenser coil 48 and is interposed in the high pressure refrigerant line 11 between the evaporative condenser and the evaporator 10.

The evaporator 10 is located in the duct $b^{11}$ between the inlet openings $b^{13}$ and $b^{14}$ and the motor driven blower $b^{15}$. It is in the form of a fin equipped coil and has an expansion valve 60 at the inlet side thereof. This valve is connected to the discharge end of the high pressure refrigerant line 11 and is adapted to cause the compressed refrigerant to enter the evaporator in an expanded condition so that it boils therein. The discharge or outlet side of the evaporator is connected with the inlet end of the low pressure refrigerant line 12 and is connected by said line to the inlet of the casing of the engine driven compressor. The inlet end of the high pressure refrigerant line 11 and the outlet or discharge end of the lower pressure refrigerant line 12 embody flexible connections 61 and 62, respectively. These connections are located in a pocket 63 in one of the side walls of the box-like housing 14 of the main operating parts of the refrigerating apparatus and permit the housing together with such parts to be shifted back and forth between their normal and inspection positions without necessitating any disconnection or uncoupling (see Figures 2 and 3). The inlet end of the connection 61 extends through the partition 19 and is connected to the receiver 13, as shown in Figure 4. The discharge end of the flexible connection 62 leads and is connected to the inlet 30 of the casing of the compressor.

In order automatically to maintain the cooling system 37 full of water and hence prevent overheating of the internal combustion engine 8, a small tube 64 is provided. This tube extends between the pipe 56 leading from the outlet of the pump 51 to the spray pipes 49 of the evaporative condenser and the pipe 40 leading from the radiator 38 of the engine cooling system to the inlet side of the pump 39. A check valve 65 is included in the tube 64 and prevents back-flow of water from the cooling system into the pipe 56. When the engine is in operation the tube 64 operates to conduct into the cooling system 37 whatever water is necessary to keep the water supply in the system 37 full at all times. In order to prevent air or vapor locks in the cooling system 37 a bleed-line 66 is provided. This line extends downwardly from the overflow portion of the radiator 38 to the water sump 50 of the evaporative condenser. By employing the tube 64 and the bleed-line 66 the cooling system 37 is automatically maintained with a full water supply so long as water is in the sump 50 of the evaporative condenser.

The operation of the apparatus is as follows: When it is desired to cool or chill the air in the passenger compartment in the body of the bus B the internal combustion engine 8 is started. As soon as the engine is set into operation the compressor 7 operates to compress the refrigerant and to force it through the condenser coil 48 of the evaporative condenser into the receiver 1. From the receiver the refrigerant in liquid form flows under pressure via the high pressure refrigerant line 11 to the expansion valve 60 and thence through the evaporator 10. Expansion or boiling of the refrigerant takes place within the evaporator and as a result of this the refrigerant serves so to cool the evaporator pipe or coil that the latter in turn absorbs the heat of the air flowing through the duct $b^{11}$ into the passenger compartment of the bus. After flowing through the evaporator, the spent refrigerant while at low pressure flows through the line 12 back to the compressor 7 where it is again compressed. During drive of the engine the evaporative condenser 9 operates by the spraying and evaporation of water on the coil 48 thereof to condense the refrigerant prior to passage thereof to the receiver 13. As heretofore pointed out, the pump of the evaporative condenser is driven by the engine and the condenser is automatically set into operation when the engine is started. During operation of the engine the fan 32 draws air into the condenser chamber 21 through the opening 33 in the inner rear end wall 18 of the housing and causes such air to pass through the radiator 38 into the chamber 20. From the latter chamber the air is propelled or forced under pressure from the housing 14 via the opening 34 in the outer end wall 19 of the housing. The radiator 38 serves to cool the water in the engine cooling system 37 and operates as an arrester for the moisture in the air stream as heretofore pointed out. When it is desired to inspect or repair any of the operating parts of the apparatus the door $b^9$ is swung outwardly and downwardly until the outer track sections 28 of the tracks 23 are aligned with the inner tracks 27. The housing 14 is then released and rolled outwards to one side of the bus body $b$. Because of the hose 58 and the flexible connections 61 and 62 the connection between the water supply tank 57 and the water sump of the evaporative condenser and also the high and low refrigerant connections 11 and 12 remain intact regardless of the position into which the housing and the operating parts therein are shifted.

The herein described refrigerating apparatus is efficient in operation and because of the arrangement and design of the various operating parts thereof has a comparatively large capacity in comparison with its size. As a result of the mounting for the housing the operating parts of the apparatus are readily accessible and do not in any way interfere with operation of the bus.

Whereas the apparatus has been described in connection with a bus, it is to be understood that it may be used in connection with any other type of wheeled vehicle and also in other capacities. It is also to be understood that the invention is not to be restricted to the details set forth, since these may be modified wihin the scope of the appended claims, without departing from the spirit and scope of the invention.

Having thus described the invention, what I claim as new and desire to secure by Letters Patent is:

1. A refrigerating apparatus comprising in combination a housing having a pair of chambers therein and air openings leading to the chambers, a refrigerant compressor disposed in one of the chambers and having high and low pressure refrigerant lines leading from and to it respectively, an internal combustion engine also in said one chamber, connected to drive the compressor and having a liquid type cooling system therefor with a radiator in the housing, an evaporative condenser for the refrigerant compressed by the compressor disposed in the other chamber and embodying a condenser coil in the high pressure refrigerant line and means for spraying liquid onto the coil, and means for causing air to flow into said other chamber and around the condenser coil and thence through the radiator and said one chamber.

2. A refrigerating apparatus comprising in combination a housing having a pair of chambers therein and air openings leading to the chambers, a refrigerant compressor disposed in one chamber and having high and low pressure refrigerant lines leading from and to it respectively, an internal combustion engine for driving the compressor disposed also in said one chamber and having a liquid type cooling system therefor with a radiator between the two chambers, an evaporative condenser for the refrigerant compressed by the compressor, disposed in said other chamber and embodying a condenser coil in the high pressure refrigerant line and means for spraying water against the coil, and a fan in said one chamber connected to be driven by the engine and arranged to cause air to flow into said other chamber and around the condenser coil and thence through the radiator and said one chamber.

3. A refrigerating apparatus comprising in combination an elongated housing having air openings in the ends thereof, a refrigerant compressor disposed in the lower central portion of the housing and having high and low pressure refrigerant lines leading from and to it respectively, an internal combustion engine for driving the compressor disposed in one end of the housing and having a liquid type cooling system therefor with a radiator disposed above the compressor and across the upper central portion of the housing, an evaporative condenser for the refrigerant compressed by the compressor, disposed in the other end of the housing and embodying a condenser coil in the high pressure refrigerant line and means for spraying water against the coil, and means for causing air to flow into said other end of the housing by way of the opening therein then around the condenser coil and through the radiator and thence through said one end of the housing and out the opening therein.

4. A refrigerating apparatus comprising in combination a housing having a pair of chambers therein and air openings leading to the chambers, a refrigerant compressor disposed in one of the chambers and having high and low pressure refrigerant lines leading from and to it respectively, an internal combustion engine for driving the compressor disposed also in said one chamber and having a liquid type cooling system therefor with a radiator between the two chambers, an evaporative condenser for the refrigerant compressed by the compressor embodying a condenser coil in the high pressure refrigerant line and disposed in the other chamber, a spray pipe adjacent to said coil, and a pump disposed in said one chamber and connected for drive by the engine and to supply water to the pipe for spray against the coil, and a fan connected for drive by the engine and arranged to cause air to flow through said other chamber and around the condenser coil and thence through the radiator and said one chamber.

5. A refrigerating apparatus comprising in combination an elongated housing having air openings in the ends thereof, a refrigerant compressor disposed in the lower central portion of the housing and having high and low refrigerant lines leading from and to it respectively, an internal combustion engine for driving the compressor disposed in said one end of the housing and having a liquid type cooling system therefor with a radiator positioned over the compressor, an evaporative condenser for the refrigerant compressed by the compressor embodying a condenser coil in the high pressure refrigerant line disposed in said other end of the housing, a spray pipe adjacent to said coil, and a pump alongside of and connected for drive by the engine and arranged to supply water to the pipe for spray against the coil, and a fan in said one end of the housing connected for drive by the engine and arranged to cause air to flow into said other end of the housing via the opening therein then around the condenser coil and through the radiator and thence through said one end of the housing and out the air opening therein.

6. The combination with a vehicle body having a main compartment with cooling means therefor and an auxiliary space adjacent to said compartment and also having a doorway in one wall thereof providing access from the exterior of the body to said space and a hinged door for the doorway, of a pair of laterally spaced tracks associated with said space and comprising inner track sections within the space and outer track sections mounted on the door and adapted when the door is in its fully open position to be aligned with and form continuations of the inner track sections, a refrigerating unit comprising a compressor for supplying refrigerant to the cooling means and a prime mover for driving the compressor, and supported on the tracks so that it is disposed within the space and carried by the inner track sections when in its normal operating position and is adapted when the door is in its said fully opened position to be shifted into an inspection position wherein it is disposed partly exteriorly of the vehicle body and carried by the outer track sections on the door.

7. The combination with a vehicle body having a compartment with cooling means therefor and a space adjacent to said compartment, of a mounting associated with said space, a refrigerator unit comprising a compressor for supplying compressed refrigerant to the cooling means, a prime mover for driving the compressor, and a pump equipped evaporative condenser adapted to condense the refrigerant compressed by the compressor, and carried by the mounting so that it is bodily shiftable from a normal operating position within the space into an inspection position adjacent to said space, and means for supplying liquid to the pump of the evaporative condenser embodying a liquid supply tank carried by the vehicle and a tubular flexible connection extending between the tank and said pump and adapted without disconnection thereof to permit shift of the unit back and forth between its operating and inspection positions.

8. A refrigerating apparatus comprising in combination a refrigerant compressor, an internal combustion engine connected to drive the compressor and embodying a radiator equipped water type cooling system therefor, an evaporative condenser adapted to condense the refrigerant compressed by the compressor and embodying a condenser coil, a spray pipe, a water sump and a pump for drawing water from the sump and delivering it under pressure to the spray pipe, and means for maintaining the cooling system for the engine full of water comprising a pipe connected to receive water under pressure from the pump of the evaporative condenser and deliver it into said system.

9. A refrigerating apparatus comprising in combination a refrigerant compressor, an internal combustion engine connected to drive the compressor and embodying a radiator equipped water type cooling system therefor, an evaporative condenser adapted to condense the refrigerant compressed by the compressor and embodying a condenser coil, a spray pipe, a water sump and a pump for drawing water from the sump and delivering it under pressure to the spray pipe, means for maintaining the cooling system for the engine full of water comprising a pipe connected to receive water under pressure from the pump of the evaporative condenser and deliver it into said system, and a bleed-line leading from the radiator back to the sump.

10. A refrigerating apparatus comprising in combination a housing having an opening equipped partition dividing the interior thereof into a pair of chambers and also having air openings leading to the chambers; a refrigerant compressor disposed in one of the chambers and having high and low pressure refrigerant lines leading from and to it respectively; an internal combustion engine for driving the compressor mounted in said one chamber and embodying a liquid type cooling system therefor with a radiator in said one chamber disposed closely adjacent to and in front of said partition opening; an evaporative condenser for the refrigerant compressed by the compressor disposed in the other chamber and embodying a condenser coil in the high pressure refrigerant line, a spray pipe positioned to spray cooling water over said coil, and a pump for supplying said cooling water to said pipe disposed in said one chamber and having a driving connection with said engine; and a fan connected to said engine for causing a flow of air through said housing; said condenser coil and said radiator being arranged in the path of a current of air drawn through said housing by the fan.

11. A refrigerating apparatus, comprising in combination a refrigerant compressor with high and low pressure refrigerant lines leading from and to it respectively, an internal combustion engine connected to drive the compressor and embodying a radiator equipped water type cooling system therefor, a water type evaporative condenser associated with the high pressure line and adapted to condense the refrigerant compressed by the compressor, a cooling water circuit for supplying water to said condenser, and means for introducing water from said circuit into the cooling system.

12. An air conditioning apparatus for a motor vehicle comprising a refrigerant evaporator positioned in said vehicle for cooling the interior thereof, a housing mounted beneath said motor vehicle and having an opening equipped partition dividing the interior thereof into two compartments, and also having an air inlet opening for one of said compartments and an air outlet opening for the other compartment, an evaporative condenser in said one compartment, said condenser being positioned closely adjacent said air inlet opening and at an angle to the vertical, spray means positioned above said condenser and arranged to spray cooling water thereover, a compressor in said other compartment operatively connected to said evaporator and condenser to form a refrigerating system, an internal combustion engine in the compartment with said compressor and operatively connected therewith to act as a prime mover therefor, a water cooling radiator for said internal combustion engine positioned closely adjacent the opening in said partition, and a fan for moving cooling air through said housing, the arrangement being such that the cooling air passes through said inlet, over said evaporative condenser, water cooling radiator, compressor, internal combustion engine and out through said air outlet opening.

13. A refrigerating apparatus comprising in combination an elongated supporting structure having at one end thereof means forming a chamber with an air inlet and an air outlet, a refrigerant compressor associated with the structure and having high and low pressure refrigerant lines leading from and to it respectively, an internal combustion engine for driving the compressor mounted on the other end of the supporting structure and having a liquid type cooling system therefor with a radiator adjacent to the air outlet, an evaporative condenser for the refrigerant compressed by the compressor disposed in said chamber and embodying a condenser coil in the high pressure refrigerant line and means for spraying liquid onto the coil, and means driven by the engine for causing air to flow first into the chamber through the inlet opening and thence around the condenser coil and through said radiator.

14. A refrigerating apparatus comprising in combination an elongated supporting structure having at one end thereof means forming a chamber with a water sump at the bottom thereof and with an air inlet and an air outlet at certain of its sides, a refrigerant compressor associated with the structure and having high and low pressure refrigerant lines leading from and to it respectively, an internal combustion engine for driving the compressor mounted on the other end of the supporting structure and having a liquid type cooling system therefor with a radiator adjacent to the air outlet, an evaporative condenser for the refrigerant compressed by the compressor disposed in said chamber and embodying a condenser coil in the high pressure refrigerant line, a spray pipe adjacent to the coil and a pump for pumping water from the sump and through the spray pipe onto the coil, and means driven by the engine for causing air to flow first into the chamber through the inlet opening and thence around the condenser coil and through said radiator.

15. A refrigerating apparatus comprising in combination an elongated supporting structure having at one end thereof means forming a chamber with a water sump at the bottom and also with an air inlet and an air outlet above the sump, a refrigerant compressor associated with the structure and having high and low pressure refrigerant lines leading from and to it respectively, an internal combustion engine for driving the compressor mounted on the other end of the supporting structure and having a liquid type cooling system therefor with a radiator disposed adjacent the air outlet, an evaporative condenser for the refrigerant compressed by the compressor disposed in said chamber and embodying a condenser coil in the high pressure refrigerant line and over the sump, a spray pipe adjacent to the coil, and a pump along side of and connected for drive by the engine and arranged so that during drive thereof it draws water from the sump and delivers it under pressure to the spray pipe for spray against the coil, and a fan connected for drive by the engine and arranged to cause air to flow first into the chamber through the inlet opening and thence around the condenser coil and through said radiator.

16. The combination with a vehicle body having a compartment with cooling means therefor and a space adjacent to said compartment, of a mounting associated with said space, a refrigerating unit comprising a compressor for supplying compressed refrigerant to the cooling means, a prime mover for driving the compressor, and an evaporative condenser for condensing the compressed refrigerant carried by the mounting so that it is bodily shiftable from a normal operating position within the space and an inspection position adjacent to said space and embodying a condenser coil, a spray pipe adjacent the coil, a water sump beneath said coil, and a pump for drawing water from the sump and delivering it under pressure to the spray pipe, and means for supplying make up water to the sump including a water tank carried by the vehicle and a tubular flexible connection extending between the tank and the sump and adapted, without disconnection thereof, to permit shift of the condenser back and forth between its operating and inspection positions.

17. The combination with a vehicle body having a compartment with cooling means therefor and a space adjacent to said compartment, of a mounting associated with said space, a refrigerating unit comprising a compressor for supplying compressed refrigerant to the cooling means, a prime mover for driving the compressor, and an evaporative condenser for condensing the compressed refrigerant carried by the mounting so that it is bodily shiftable from a normal operating position within the space and an inspection position adjacent to said space and embodying a condenser coil, a spray pump adjacent to the coil, a water sump beneath said coil, and a pump for drawing water from the sump and delivering it under pressure to the spray pipe, and means for maintaining the water in the sump at a substantially uniform level comprising a supply tank carried by the vehicle, a float-controlled valve associated with the sump and in fixed relation with the condenser, and a tubular flexible connection extending between the tank and the valve and adapted, without disconnection thereof, to permit shift of the condenser back and forth between its operating and inspection positions.

18. A refrigerating apparatus comprising in combination a supporting structure having means forming a chamber with a water sump at the bottom and also with an air inlet and an air outlet above the sump, a refrigerant compressor associated with the structure and having high and low pressure refrigerant lines leading from and to it respectively, an internal combustion engine for driving the compressor mounted on the structure exteriorly of said chamber and having a liquid type cooling system therefor with a radiator adjacent the air outlet, an evaporative condenser for the compressed refrigerant disposed in said chamber and embodying a condenser coil in the high pressure line and over the sump, a spray pipe adjacent the coil, and a pump for pumping water from the sump and through the spray pipe onto the coil, and fan means for causing air to flow first into the compartment through the inlet and thence around the condenser coil and through the radiator, said radiator serving in addition to part of the engine cooling system as a moisture arrester and being arranged so that any moisture arrested thereby is delivered back to the sump.

19. A refrigerating apparatus comprising in combination means forming a chamber with a water sump at the bottom and also with a screen equipped air inlet and an air outlet above the sump, a refrigerant compressor having high and low pressure refrigerant lines leading from and to it respectively, an internal combustion engine for driving the compressor positioned exteriorly of said chamber and having a liquid type cooling system therefor with a radiator adjacent the air outlet, an evaporative condenser for the compressed refrigerant disposed in said chamber and embodying a condenser coil in the high pressure line and over the sump, a spray pipe adjacent the coil, and a pump connected for drive by the engine and arranged so that during drive thereof it draws water from the sump and delivers it under pressure to the spray pipe for spraying against the coil, and fan means driven by the engine for causing air to flow first into the compartment through the screen equipped air inlet and thence around the condenser coil and through the radiator, said radiator serving in addition to part of the engine cooling system as a moisture arrester and arranged so that any moisture arrested thereby is delivered back to the sump.

20. A refrigerating apparatus comprising in combination an elongated housing having air openings in the ends thereof, a refrigerant compressor disposed in the lower central portion of the housing and having high and low pressure refrigerant lines leading from and to it respectively, an internal combustion engine for driving the compressor disposed in one end, and extending longitudinally, of the housing and having a liquid type cooling system therefor with a radiator disposed above the compressor and across the upper central portion of the housing, an evaporative condenser for the refrigerant compressed by the compressor, disposed in the other end of the housing and embodying a condenser coil in the high pressure refrigerant line and means for spraying water against the coil, and a fan in said one end of the housing driven by the crank shaft of the engine and arranged to cause air to flow into said other end of the housing by way of the opening therein then around the condenser coil and through the radiator and thence through said one end of the housing and out the opening therein.

LEE W. MELCHER.